United States Patent [19]

Dixon

[11] 4,161,869
[45] Jul. 24, 1979

[54] WHEEL COVER LOCK

[76] Inventor: James R. Dixon, 591 N. 30th St., Apt. Q 12, Camden, N.J. 08105

[21] Appl. No.: 884,585

[22] Filed: Mar. 8, 1978

[51] Int. Cl.² .............................................. B65D 55/14
[52] U.S. Cl. .................................... 70/166; 301/37 AT
[58] Field of Search ................. 70/163, 164, 166, 167, 70/168, 258, 259; 301/37 AT, 108 S, 108 SC

[56] References Cited

U.S. PATENT DOCUMENTS

| | | | |
|---|---|---|---|
| 2,722,822 | 11/1955 | Thomas | 70/167 |
| 3,170,733 | 2/1965 | Lamme | 70/259 |
| 3,534,570 | 10/1970 | Mauro | 70/167 |
| 4,057,985 | 11/1977 | Stahl | 70/259 |

*Primary Examiner*—Kenneth J. Dorner
*Attorney, Agent, or Firm*—Duffield & Lehrer

[57] ABSTRACT

A tumbler housing coaxially mounted on a bolt including a lug nut on the other end thereof extends coaxially outwardly from one of the lugs of the wheel support of a vehicle. The end of the tumbler housing is accessible through a hole in the wheel cover through which part of a tumbler can pass so as to engage the tumbler housing and lock the wheel cover to the lug. The tumbler housing is adjustably mounted on the bolt so that the distance which it extends from the lug can be varied thereby accommodating various different wheel covers. A tab on the tumbler coincides with a complementary cut out in the wheel cover to prevent rotation of the locking mechanism.

1 Claim, 3 Drawing Figures

WHEEL COVER LOCK

BACKGROUND OF THE INVENTION

This invention relates to wheel cover locks and more particularly to a wheel cover lock which is adjustable so as to accommodate various types of wheel covers.

Wheel cover locks have been known for many years and have been somewhat effective in reducing the number of wheel covers or hubcaps which are stolen or which accidently fall off. However, most prior locks of which applicant is aware are relatively complex or sophisticated devices which, therefore, tend to be relatively expensive. In addition, many of these devices are an integral part of the wheel cover or are designed to be used with a particular type of wheel cover. This requires one desiring to employ wheel cover locks to purchase a specific lock and wheel cover for a particular car. The locks and wheel covers were normally not interchangeable. This, of course, made the use of wheel cover locks relatively expensive.

SUMMARY OF THE INVENTION

The present invention overcomes the problems of the prior art devices known to applicant by providing a relatively simple and inexpensive locking mechanism which can be used with a wide variety of different types of cars and wheel covers. This is accomplished by a tumbler housing coaxially on a bolt including a lug nut on the other end thereof extending coaxially outwardly from one of the lugs of the wheel support of a vehicle. The end of the tumbler housing is accessible through a hole in the wheel cover through which part of a tumbler can pass so as to engage the tumbler housing and lock the wheel cover to the lug. The tumbler housing is adjustably mounted on the bolt so that the distance which it extends from the lug nut can be varied thereby accomodating various different wheel covers. A tab on the tumbler coincides with a complementary cut out in the wheel cover to prevent rotation of the locking mechanism.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
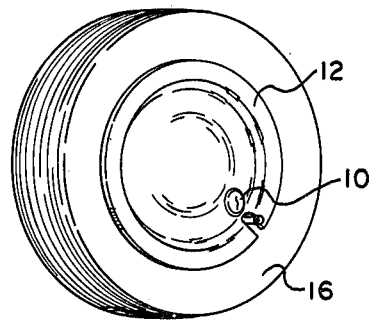
FIG. 1 is a perspective view of an automobile tire showing a wheel cover locked to the wheel utilizing the present invention.

Referring now to the drawings in detail, wherein like reference numerals have been used throughout the various figures to identify like elements, numeral 10 refers generally to a wheel cover lock constructed in accordance with the principles of the present invention and shown in FIG. 1 locking a wheel cover 12 to a wheel 14 (not shown in FIG. 1). Wheel 14 supports tire 16.

Figure 3:
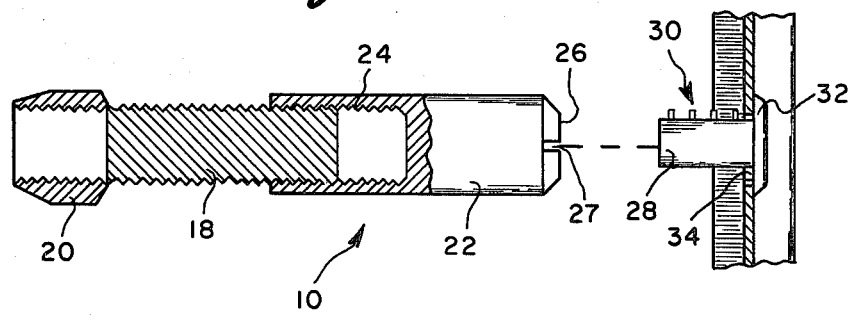
FIG. 3 is an enlarged elevational view partly in cross-section of the present invention.

As shown most clearly in FIG. 3, wheel cover lock 10 is comprised of a cylindrically shaped bolt 18 having a nut 20 welded or otherwise secured to one end thereof. Attached to the other end of bolt 18 is a substantially cylindrically shaped tumbler housing 22. The rear portion of housing 22 includes an internally threaded elongated opening 24 into which is adapted to be threaded bolt 18.

The forward free end of tumbler housing 22 includes an opening 26 which is adapted to receive the barrel 28 of tumbler member 30. Adjacent the opening 26 is a slot 27 formed in the annularly shaped end wall and extending across the entire diameter thereof. Tumbler member 30 includes an enlarged flange 32 at the forward end thereof. Projecting inwardly from the underside of the flange 32 is a tab member 34. All of the bolt 18, nut 20, tumbler housing 22 and tumbler member 30 are arranged to be coaxial with each other.

The details of the workings of and the interaction between the tumbler member 30 and the tumbler housing 22 are well known in the art and accordingly, a detailed description thereof is not believed to be necessary. Suffice it is to say that when key 36 is inserted into the tumbler member 30 and is in one position, the barrel 28 is freely movable into and out of the opening 26 of the tumbler housing 22. When the key 36 is turned so as to be in a second position, the barrel 28 is locked into the housing 22. Similar arrangments are described, for example, in U.S. Pat. Nos. 2,722,822 and 4,057,985.

The wheel cover lock of the present invention is used in the following manner. Firstly, the wheel 14 is mounted to the wheel support 38 by the lugs 40 and lug nuts 42 in the conventional manner. In other words, with the present invention, no modifications need be made to the wheel, lugs or lug nuts of the automobile. Thereafter, the nut 20 is screwed onto the lug 40 closest to the valve stem 44. The entire assembly 10 is, therefore, also coaxial with the lug 40.

Figure 2:
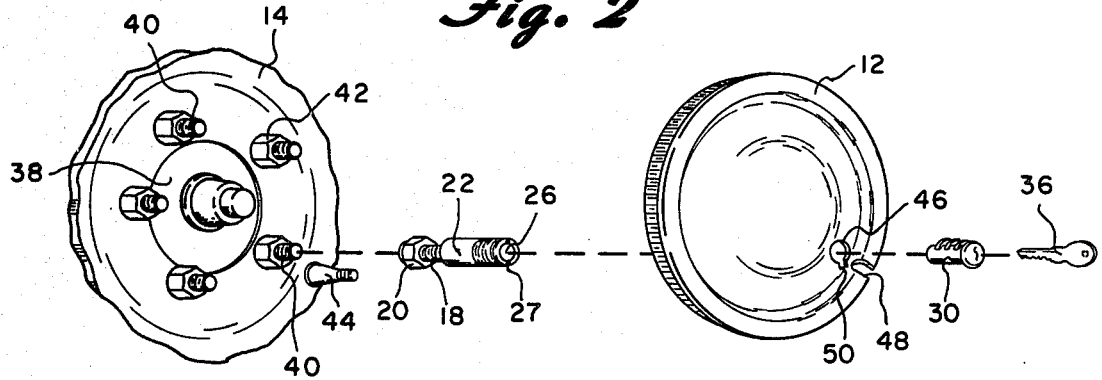
FIG. 2 is an exploded view showing the components of the present invention and illustrating the interrelationship of the wheel cover and wheel.

The wheel cover 12 is then put in place on the wheel 14. As shown best in FIG. 2, a small hole 46 is made in the wheel cover in a position which will directly overlie the lug 40 closest to the valve stem 44. The lug closest to the valve stem is chosen since substantially every wheel cover includes an opening such as opening 48 for the valve stem 44 so that the alignment and location of the hole 46 can be more easily and accurately made using the opening 48 as a guide or reference point.

The hole 46 is large enough to allow the barrel 28 to pass through but is smaller than the flange 32 so that the flange cannot pass through the hole 46. Hole 46 is substantially circular but includes a smaller cut out portion 50 which is adapted to mate with the projection 34. This prevents the tumbler member 30 from turning once it is in place. As should be readily apparent, once the wheel cover 12 is mounted on the wheel, the tumbler member 30 is passed through the hole 46 and into the tumbler housing 22 and locked. The flange 32 then prevents the wheel cover 12 from being removed from the wheel.

As pointed out above, the present invention is adjustable so as to accommodate various different types of wheel covers. The surfaces of some wheel covers are closer to the wheel lugs than others. The present invention easily accommodates these various wheel covers by merely rotating tumbler housing 22 relative to bolt 18. The distance between opening 26 and nut 20 can then be increased or decreased as desired.

The proper length for a particular application is found in the following manner. The bolt 18 is screwed substantially entirely into the opening 24. In other words, the wheel cover lock 10 is made as small as possible. The nut 20 is screwed onto the lug 40 and the wheel cover 12 is put in place. A screw driver or similar tool is inserted through the hole 46 and into the opening 26 or into slot 27 formed on the forward face of the housing 22 adjacent the opening 26. The screw driver is then turned to thus rotate the housing 22 relative to the bolt 18. Rotation continues until the forward end of the housing 22 contacts the inner surface of the wheel cover 12. At this point, the wheel cover lock 10 is properly adjusted and the tumbler member 30 is locked into place.

The present invention may be embodied in other specific forms without departing from the spirit or essential attributes thereof and, accordingly, reference should be made to the appended claims, rather than to the foregoing specification as indicating the scope of the invention.

I claim:

1. A wheel cover lock comprising:

an elongated cylindrically shaped bolt having a nut coaxially and fixedly secured to one end thereof such that said bolt and said nut will always move in unison with each other, said nut being adapted to be secured to one of the wheel lugs of a vehicle;

a substantially cylindrically shaped tumbler housing coaxially threaded onto the other end of said bolt such that the distance between said nut and said tumbler housing is adjustable by rotating said tumbler housing relative to said bolt, the free end of said tumbler housing having an annularly shaped end wall, a slot formed in said end wall and extending across the entire diameter thereof, said slot being adapted to receive the tip of a screw driver;

a tumbler member adapted to cooperate with said tumbler housing, said tumbler member including a first portion adapted to pass through a hole in a wheel cover so as to cooperate with said tumbler housing and a second larger portion which is incapable of passing through said hole, said tumbler member including a means extending therefrom adjacent said second larger portion which is adapted to cooperate with said wheel cover to prevent rotation of said wheel cover lock relative to said wheel cover.

* * * * *